(12) United States Patent
Liu et al.

(10) Patent No.: US 11,003,000 B2
(45) Date of Patent: May 11, 2021

(54) BACKLIGHT MODULE, DISPLAY DEVICE AND CONTROL METHOD THEREOF

(71) Applicants: FUZHOU BOE OPTOELECTRONICS TECHNOLOGY CO., LTD., Fujian (CN); BOE TECHNOLOGY GROUP CO., LTD., Beijing (CN)

(72) Inventors: Jie Liu, Beijing (CN); Heling Zhu, Beijing (CN); Ming Li, Beijing (CN); Xiaoyan Tu, Beijing (CN); Kai Diao, Beijing (CN); Baoqiang Wang, Beijing (CN); Woong Kim, Beijing (CN); Xibin Shao, Beijing (CN); Guangyan Sun, Beijing (CN); Xin Li, Beijing (CN)

(73) Assignees: Fuzhou BOE Optoelectronics Technology Co., Ltd., Fuzhou (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/825,598

(22) Filed: Mar. 20, 2020

(65) Prior Publication Data

US 2021/0096404 A1    Apr. 1, 2021

(30) Foreign Application Priority Data

Sep. 26, 2019    (CN) .......................... 201910915630.4

(51) Int. Cl.
*G02F 1/13*    (2006.01)
*G02F 1/13357*    (2006.01)

(52) U.S. Cl.
CPC ...... *G02F 1/1323* (2013.01); *G02F 1/133606* (2013.01)

(58) Field of Classification Search
CPC .......................... G02F 1/1323; G02F 1/133606
USPC ........................................................ 362/97.2
See application file for complete search history.

(56) References Cited

U.S. PATENT DOCUMENTS

| | | | |
|---|---|---|---|
| 2006/0191177 A1* | 8/2006 | Engel | G09F 9/35 40/453 |
| 2010/0033827 A1* | 2/2010 | Foley | H01J 11/44 359/614 |
| 2013/0300985 A1* | 11/2013 | Bulda | G02F 1/1323 349/86 |
| 2014/0226093 A1* | 8/2014 | Schwartz | G02F 1/13476 349/12 |
| 2014/0232960 A1* | 8/2014 | Schwartz | B32B 27/06 349/12 |
| 2016/0011441 A1* | 1/2016 | Schwartz | G02F 1/1323 359/275 |

(Continued)

*Primary Examiner* — Bryon T Gyllstrom
(74) *Attorney, Agent, or Firm* — The Webb Law Firm

(57) ABSTRACT

The present disclosure provides a backlight module, a display device and a control method thereof, and relates to the technical field of display. The backlight module includes: a light source; an optical film; a privacy film disposed on a light exit side of the optical film, and configured to reduce a divergence angle of light from the optical film; and a dimming assembly disposed on one side of the privacy film away from the optical film, and configured to not change a divergence angle of light from the privacy film in a case of being in a first state, and increase the divergence angle of the light from the privacy film in a case of being in a second state.

20 Claims, 4 Drawing Sheets

(56) References Cited

U.S. PATENT DOCUMENTS

| | | | |
|---|---|---|---|
| 2018/0122292 A1* | 5/2018 | Ju | G02B 3/005 |
| 2018/0188576 A1* | 7/2018 | Xu | G02F 1/133723 |
| 2019/0033631 A1* | 1/2019 | Kuo | G02B 27/022 |
| 2019/0137826 A1* | 5/2019 | Park | G02F 1/133606 |
| 2019/0331944 A1* | 10/2019 | Fang | G02F 1/1323 |
| 2019/0353943 A1* | 11/2019 | Smith | G02F 1/1323 |
| 2020/0201088 A1* | 6/2020 | Yao | G02F 1/133753 |

* cited by examiner

BACKLIGHT MODULE, DISPLAY DEVICE AND CONTROL METHOD THEREOF

CROSS-REFERENCE TO RELATED APPLICATIONS

This application claims priority to Chinese Patent Application No. 201910915630.4 filed Sep. 26, 2019, the disclosure of which is hereby incorporated by reference in its entirety.

BACKGROUND OF THE INVENTION

Field of the Invention

The present disclosure relates to a backlight module, a display device and a control method thereof.

Description of Related Art

With the development of the information network, personal privacy is increasingly valued. Regardless of personal needs or office considerations, a display device capable of implementing a privacy function is required.

In the related art, privacy is implemented by externally mounting a privacy sheet on a display device. When privacy is required, the privacy sheet is manually installed on the display device; and when privacy is not required, the privacy sheet is removed from the display device.

SUMMARY OF THE INVENTION

According to one aspect of the embodiments of the present disclosure, a backlight module is provided. The backlight module comprises: alight source; an optical film; a privacy film disposed on a light exit side of the optical film, and configured to reduce a divergence angle of light from the optical film; and a dimming assembly disposed on one side of the privacy film away from the optical film, and configured to not change a divergence angle of light from the privacy film in a case of being in a first state, and increase the divergence angle of the light from the privacy film in a case of being in a second state.

In some embodiments, the light source is configured to emit light with a first brightness in the case where the dimming assembly is in the first state, and to emit light with a second brightness in the case where the dimming assembly is in the second state, wherein the first brightness is smaller than the second brightness.

In some embodiments, the optical film comprises a diffusion film and a prism film, and the privacy film is disposed on one side of the prism film away from the diffusion film.

In some embodiments, the dimming assembly comprises: a first transparent electrode; a second transparent electrode; and a liquid crystal dimming film disposed between the first transparent electrode and the second transparent electrode.

In some embodiments, the liquid crystal dimming film is in a transparent state in the case where the dimming assembly is in the first state, and in a diffusion state in the case where the dimming assembly is in the second state.

In some embodiments, the backlight module further comprises: a backplane comprising a bottom plate and a side plate connected to the bottom plate, wherein the bottom plate and the side plate define an accommodating space; a light guide plate disposed in the accommodating space, wherein the optical film is disposed on one side of the light guide plate away from the bottom plate, and the light source is disposed between the light guide plate and the side plate; a middle frame, comprising: a first middle frame portion disposed on one side of the side plate away from the light source, and a second middle frame portion connected to the first middle frame portion, and configured to fix the dimming assembly and support a display panel; a first wire connected to the first transparent electrode, wherein the first wire extends between the side plate and the first middle frame portion, and further extends to one side of the bottom plate away from the light guide plate; and a second wire connected to the second transparent electrode, wherein the second wire extends between the sideplate and the first middle frame portion, and further extends to one side of the bottom plate away from the light guide plate.

In some embodiments, the backlight module further comprises: a heat insulator disposed between the side plate and at least one of the first wire or the second wire.

In some embodiments, the heat insulator extends from one side of the side plate away from the light source to one side of the light source away from the bottom plate.

In some embodiments, the first wire and the second wire are disposed in a flexible printed circuit.

In some embodiments, a material of the liquid crystal dimming film comprises a polymer dispersed liquid crystal.

In some embodiments, a material of at least one of the first transparent electrode or the second transparent electrode comprises indium tin oxide.

In some embodiments, a material of the heat insulator comprises silica gel.

In some embodiments, the privacy film comprises a plurality of grating bodies, wherein adjacent grating bodies of the plurality of grating bodies define a gap, and each of the plurality of grating bodies is opaque.

According to another aspect of embodiments of the present disclosure, a display device comprising the backlight module according to any one of the above embodiments is provided.

In some embodiments, the display device further comprises: a display panel disposed on one side of the dimming assembly away from the privacy film.

In some embodiments, the display device further comprises: a control circuit configured to control the dimming assembly to be in one of the first state and the second state in response to a control signal.

In some embodiments, the control circuit is further configured to control the light source to emit light with a first brightness in the case where the dimming assembly is in the first state, and control the light source to emit light with a second brightness in the case where the dimming assembly is in the second state, wherein the first brightness is smaller than the second brightness.

In some embodiments, the display device further comprises: a printed circuit board disposed on one side of the backlight module away from a light exit side of the backlight module, wherein the printed circuit board is provided with the control circuit.

According to a further aspect of the present disclosure, a control method of the display device according to any one of the above embodiments is provided. The control method comprises: controlling the dimming assembly to be in the first state to not change the divergence angle of the light from the privacy film, in response to a first operation by a user; and controlling the dimming assembly to be in the second state to increase the divergence angle of the light from the privacy film, in response to a second operation by the user.

In some embodiments, the control method further comprises: controlling the light source to emit light with a first brightness in response to the first operation; and controlling the light source to emit light with a second brightness in response to the second operation, wherein the first brightness is smaller than the second brightness.

Other features, aspects and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

Figure 1:
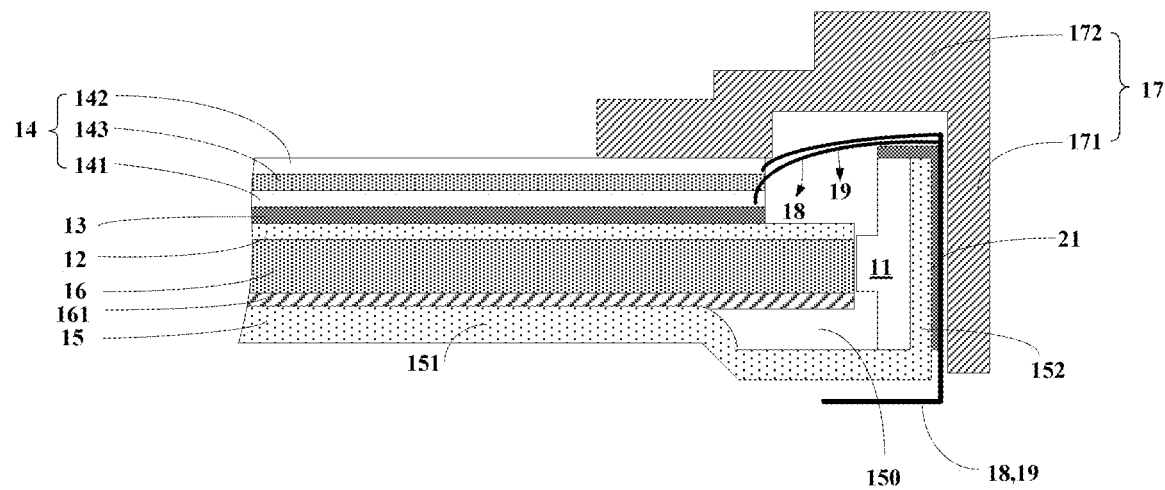
FIG. 1 is a schematic structural view showing a backlight module according to an embodiment of the present disclosure.

It should be understood that the dimensions of the various parts shown in the accompanying drawings are not necessarily drawn according to the actual scale. In addition, the same or similar reference signs are used to denote the same or similar components.

DESCRIPTION OF THE INVENTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element (s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (comprising technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

It is inconvenient to implement a privacy function by externally mounting a privacy sheet in the related art. Further, the privacy sheet is easily affected by the environment, thereby affecting the implementation of a privacy function.

In the embodiments of the present disclosure, a privacy film and a dimming assembly are disposed in a backlight module, so that the backlight module can switch between a privacy mode and a sharing mode.

The backlight module according to some embodiments of the present disclosure will be described below in conjunction with different embodiments.

FIG. 1 is a schematic structural view showing a backlight module according to an embodiment of the present disclosure.

As shown in FIG. 1, the backlight module 10 may comprise a light source 11, an optical film 12, a privacy film 13, and a dimming assembly 14.

In some embodiments, the light source 11 may comprise, for example, a light emitting diode (LED) light bar. It should be understood that, according to different embodiments, the backlight module 10 may further comprise other members. For example, referring to FIG. 1, when the light source 11 is an edge-type light source, the backlight module 10 may further comprise members such as a light guide plate 16. In this case, the optical film 12 is disposed on the light exit side of the light guide plate 16. For another example, in a case where the light source 11 is a direct-type light source, the backlight module 10 may further comprise members such as a diffusion plate. In this case, the optical film 12 is disposed on the light exit side of the diffusion plate 16.

The privacy film 13 is disposed on the light exit side of the optical film 12. The privacy film 13 is configured to reduce a divergence angle of light from the optical film 12. For example, the privacy film 13 is configured to reduce the divergence angle of the light from the optical film 12 from 180 degrees to 60 degrees.

As some implementations, the privacy film 13 may comprise a grating structure. The grating structure may comprise a plurality of grating bodies, adjacent grating bodies defining a gap. Each grating body is opaque, and light can be transmitted through the gap. Therefore, the light from the optical film 12 will be blocked upon incidence on the grating bodies at certain angles, which reduces the divergence angle of the light from the optical film 12. It should be understood that the privacy film 13 is not limited to the above implementation as long as the divergence angle of light can be reduced.

In some implementations, the optical film 12 may comprise a diffusion film and a prism film. In this case, the privacy film 13 may be disposed on one side of the prism film away from the diffusion film. For example, the privacy film 13 may be in direct contact with the prism film. It should be understood that the function of the diffusion film is to diverge light exiting from the diffusion film uniformly to various angles. The function of the prism film is to improve the angular distribution of light. The prism film may converge light exiting from the diffusion film to an axial angle, that is, a front view angle. In this way, the axial brightness can be improved without increasing a total outgoing luminous flux.

The dimming module 14 is disposed on one side of the privacy film 13 away from the optical film 12. The dimming module 14 is configured to not change a divergence angle of light from the privacy film 13 in a case of being in a first state and configured to increase the divergence angle of the light from the privacy film 13 in a case of being in a second state.

In a case where the dimming module 14 does not change the divergence angle of the light from the privacy film 13, the backlight module may implement a privacy function; in a case where the dimming module 14 increases the divergence angle of the light from the privacy film 13, the backlight module may implement a sharing function.

In the above embodiments, the privacy film 13 is disposed on the light exit side of the optical film 12 and can reduce the divergence angle of the light from the optical film 12. The dimming assembly 14 may increase or not change the divergence angle of the light from the privacy film 13. In a case where such a backlight module 10 is applied to a display device, the display device can have various view angles and thus can switch between the privacy mode and the sharing mode. In addition, the privacy film 13 is disposed on the light exit side of the optical film 12 and thus can achieve a function of reducing a divergence angle of light without being affected by other members.

In some implementations, referring to FIG. 1, the dimming assembly 14 may comprise a first transparent electrode 141, a second transparent electrode 142, and a liquid crystal dimming film 143 disposed between the first transparent electrode 141 and the second transparent electrode 142. In some embodiments, in a case where the dimming assembly 14 is in the first state, the liquid crystal dimming film 143 is in a transparent state; and in a case where the dimming assembly 14 is in the second state, the liquid crystal dimming film 143 is in a diffusion state. In other words, the dimming assembly 14 is in the first state may be understood as that the liquid crystal dimming film 143 in the dimming assembly 14 is in a transparent state; and the dimming assembly 14 is in the second state may be understood as that the liquid crystal dimming film 143 in the dimming assembly 14 is in a diffusion state.

It should be understood that although FIG. 1 shows that the first transparent electrode 141 is closer to the privacy film 13 than the second transparent electrode 142, this is not restrictive. In some implementations, the positions of the first transparent electrode 141 and the second transparent electrode 142 may be interchanged. As some examples, the material of at least one of the first transparent electrode 141 or the second transparent electrode 142 may comprise, for example, a transparent material such as indium tin oxide (ITO). As some examples, the material of the liquid crystal dimming film 143 may comprise, for example, a material such as polymer dispersed liquid crystal (PDLC).

The operation principles of the dimming assembly 14 will be introduced below with the liquid crystal dimming film 143 which is a PDLC as an example.

In a case where there is an electric field between the first transparent electrode 141 and the second transparent electrode 142, the PDLC 143 is in a transparent state, that is, the dimming assembly 14 is in the first state. In this case, the light from the privacy film 13 is directly transmitted through the PDLC 143 with an unchanged divergence angle.

When there is no electric field between the first transparent electrode 141 and the second transparent electrode 142, the PDLC 143 is in a diffusion state, that is, the dimming assembly 14 is in the second state. In this case, the light from the privacy film 13 is scattered by the PDLC 143 and has an increased divergence angle.

It should be understood that, the dimming assembly 14 in the first state will exit more light than the dimming assembly 14 in the second state. In order that brightness of the light emitted from the backlight module 10 in the privacy mode is close to that of the light emitted from the backlight module 10 in the sharing mode and a better visual effect is achieved, embodiments of the present disclosure also provide the following solutions.

In some embodiments, the light source 11 in the backlight module 10 is configured to emit light with a first brightness in a case where the dimming assembly 14 is in the first state, and to emit light with a second brightness in a case where the dimming assembly 14 is in the second state. Here, the first brightness is smaller than the second brightness.

For example, the brightness of the light emitted from the light source 11 may be controlled by controlling the current passing through the light source 11. The light source 11 emits relatively darker light in a case where the dimming assembly 14 is in the first state and emits relatively brighter light in a case where the dimming assembly 14 is in the second state. Therefore, the brightness of the light emitted from the backlight module 10 in the privacy mode is relatively close to, for example equal to, the brightness of the light emitted from the backlight module 10 in the sharing mode.

In some embodiments, referring to FIG. 1, the backlight module 10 comprises a backplane 15. The backplane 15 comprises a bottom plate 151 and a side plate 152 connected to the bottom plate 151. Here, the bottom plate 151 and the side plate 152 define an accommodating space 150.

The backlight module 10 further comprises a light guide plate 16 disposed in the accommodating space 150. The optical film 12 is disposed on one side of the light guide plate 16 away from the backplane 151, and the light source 11 is disposed between the light guide plate 16 and the side plate 152. In some embodiments, the backlight module 10 may further comprise a reflecting member 161, disposed between the light guide plate 16 and the bottom plate 151, for reflecting light transmitted from the light guide plate 16 back to the light guide plate 16 to improve light utilization efficiency.

The backlight module 10 further comprises a middle frame 17. The middle frame 17 comprises a first middle frame portion 171 and a second middle frame portion 172 connected to the first middle frame portion 171. The first middle frame portion 171 is disposed on one side of the side plate 152 away from the light source 11. The second middle frame portion 172 is configured to fix the dimming assembly 14 and support a display panel (not shown).

The backlight module 10 further comprises a first wire 18 connected to the first transparent electrode 141 and a second wire 19 connected to the second transparent electrode 142. The first wire 18 extends between the side plate 152 and the first middle frame portion 171, and further extends to one side of the bottom plate 151 away from the light guide plate 16. Similarly, the second wire 19 extends between the side plate 152 and the first middle frame portion 171, and further extends to one side of the bottom plate 151 away from the light guide plate 16. It should be understood that FIG. 1 only schematically shows that the first wire 18 and the second wire 19 extend between the side plate 152 and the first middle frame portion 171, the first wire 18 and the second wire 19 are spaced apart rather than integrated or intersected.

In some implementations, the first wire 18 and the second wire 19 may be disposed in a flexible printed circuit. The flexible printed circuit may extend from the first transparent electrode 141 and the second transparent electrode 142 to between the side plate 152 and the first middle frame portion 171, and then extend to one side of the bottom plate 151 away from the light guide plate 16.

In some embodiments, the backlight module 10 may further comprise a heat insulator 21. The heat insulator 21 may be disposed between the side plate 152 and at least one of the first wire 18 or the second wire 19. In some embodiments, the heat insulator 21 may extend from one side of the side plate 152 away from the light source 11 to one side of the light source 11 away from the bottom plate 151. As some examples, the material of the heat insulator 21 may comprise silica gel and the like.

In the above embodiments, the backlight module 10 comprises a heat insulator 21, which may reduce the adverse effect of the light source 11 on the performance of the first wire 18 and the second wire 19. The possibility that the dimming assembly 14 cannot work normally is reduced.

Figure 2:
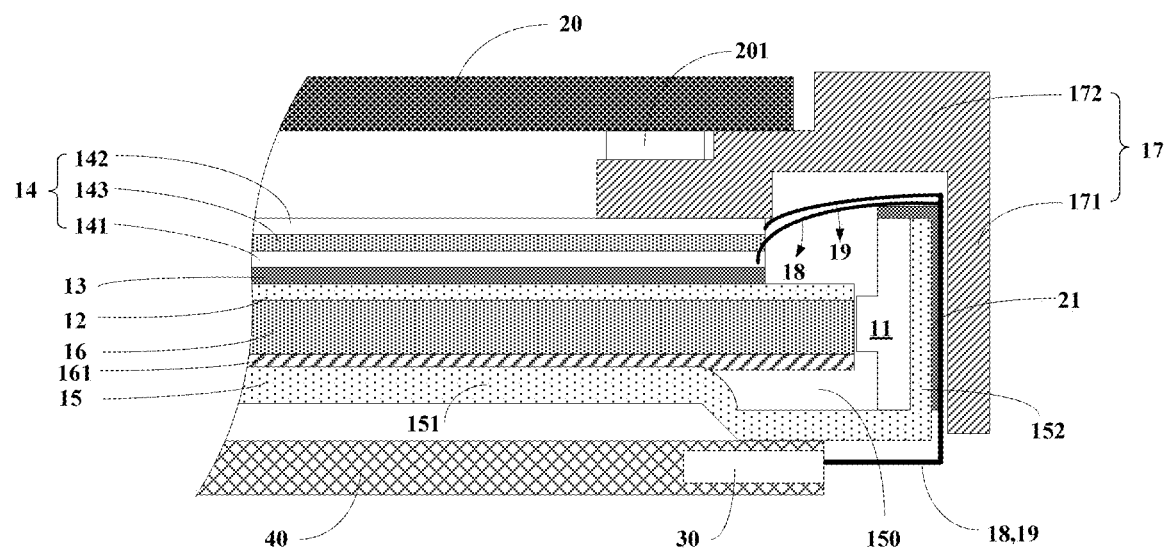
FIG. 2 is a schematic structural view showing a display device according to an embodiment of the present disclosure.

FIG. 2 is a schematic structural view showing a display device according to an embodiment of the present disclosure.

As shown in FIG. 2, the display device may comprise the backlight module 10 of any one of the above embodiments and a display panel 20.

The display panel 20 is disposed on one side of the dimming module 14 away from the privacy film 13. In addition, the display panel 20 may be supported by the second middle frame portion 172 of the middle frame 17. In some embodiments, a buffer 201 may be disposed between the display panel 20 and the second middle frame portion 172.

The display panel 20 may comprise a liquid crystal display panel. For example, the display panel may comprise an array substrate, a color filter substrate, and a liquid crystal disposed between the array substrate and the color filter substrate.

In some embodiments, the display device may be, for example, any product or assembly having a display function, such as a mobile terminal, a television, a display, a notebook computer, a digital photo frame, a navigator, or an electronic paper.

In some embodiments, referring to FIG. 2, the display device may further comprise a control circuit 30. The control circuit 30 may be connected to the first wire 18 and the second wire 19. The control circuit 30 is configured to control the dimming assembly 14 to be in one of the first state and the second state described above in response to a control signal.

In some embodiments, the control circuit 30 is further configured to control the light source 11 in the backlight module 10 to emit light with a first brightness in the case where the dimming assembly 14 is in the first state, and to emit light with a second brightness greater than the first brightness in the case where the dimming assembly 14 is in the second state. For example, the control circuit 30 is configured to control the brightness of light emitted from the light source 11 in the backlight module 10 to decrease, in a case where the dimming assembly 14 switches from the second state to the first state described above; and to control the brightness of light emitted from the light source 11 in the backlight module 10 to increase, in a case where the dimming assembly 14 switches from the second state to the first state described above.

In some embodiments, the display device may further comprise a printed circuit board 40. The printed circuit board 40 is disposed on one side of the backlight module 10 away from the light exit side of the backlight module 10. The printed circuit board 40 may be provided with the above control circuit 30. For example, the printed circuit board 40 may be disposed on one side of the bottom plate 151 away from the light guide plate 16. As some examples, the printed circuit board 40 may be adhered to the bottom plate 151 (for example, through an adhesive tape), or connected to the bottom plate 151 through a connecting piece (for example, a screw or the like).

Figure 3:
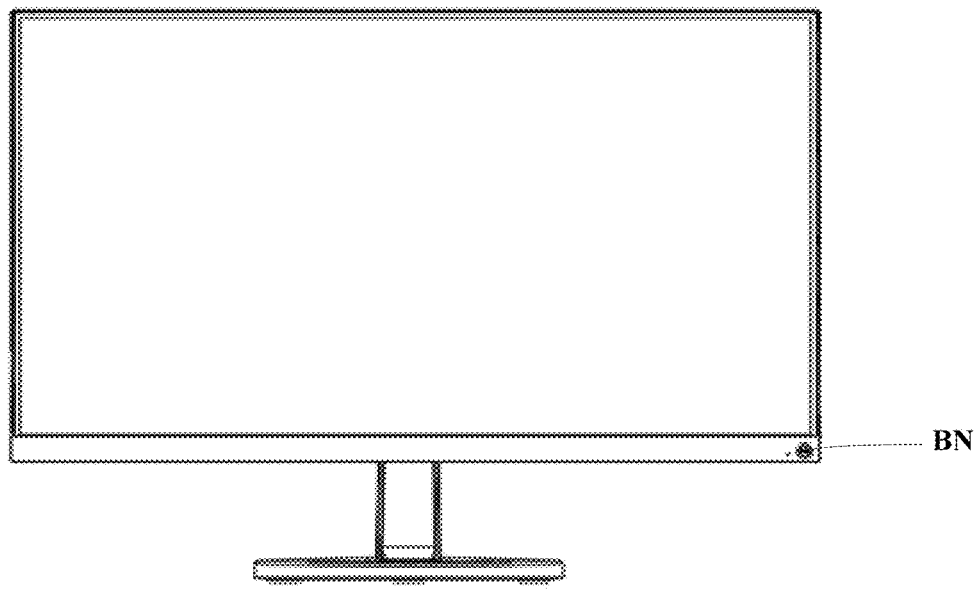
FIG. 3 is a schematic view showing an appearance of a display device according to an embodiment of the present disclosure.

FIG. 3 is a schematic view showing an appearance of a display device according to an embodiment of the present disclosure.

As shown in FIG. 3, the display device may be a display. The display may be provided with a button BN. The user may control the display to work in the privacy mode or the sharing mode by operating the button BN. For example, after the display is turned on, the display is in the sharing mode by default. If the user needs to protect privacy, the user may press the button BN (a first operation). At this time, the display switches from the sharing mode to the privacy mode. If the user does not need to protect privacy, the user may press the button BN again (a second operation), and the display switches from the privacy mode to the sharing mode at this time.

It should be understood that the above button BN is only an example of implementing the switch of the display between the privacy mode and the sharing mode. In some embodiments, the switch of the display between the privacy mode and the sharing mode may be implemented by providing two buttons on the display or through a touch operation.

Figure 4:
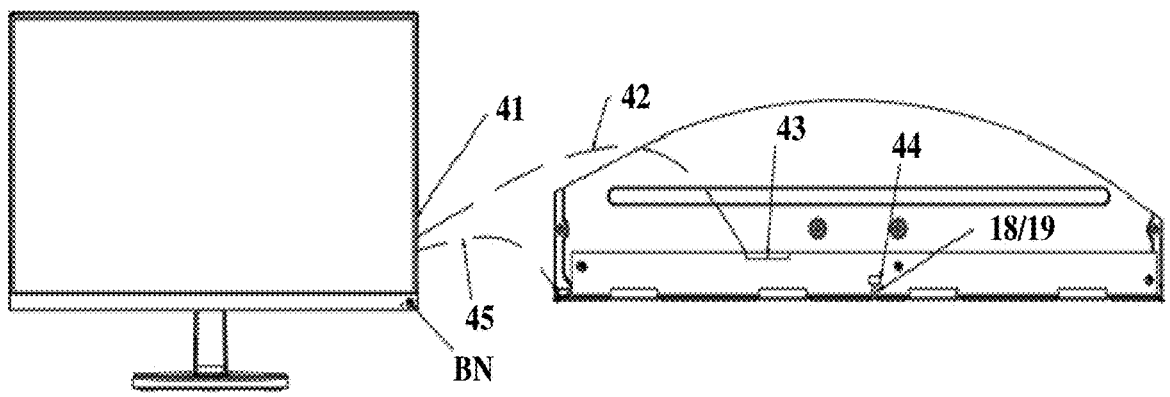
FIG. 4 is a schematic view showing signal lines and interfaces of a display device according to an embodiment of the present disclosure.

FIG. 4 is a schematic view showing signal lines and interfaces of a display device according to an embodiment of the present disclosure.

As shown in FIG. 4, after the user operates the button BN, an entire system 41 of the display device sends a control signal, through a system signal line 42, to the control circuit 30 (not shown in FIG. 4) connected to a system signal line interface 43. The control circuit 30 is connected to a conductive wire interface 44. The control circuit 30 controls the voltage between the first transparent electrode 141 and the second transparent electrode 142 in the dimming assembly 14 through the first wire 18 and the second wire 19 in response to the control signal, so as to control the dimming assembly 14 to be in one of the first state and the second state as described above, so that the display device operates in a privacy mode or a sharing mode. In addition, FIG. 4 also shows a light source control line 45. The control circuit 30 may control the brightness of bright emitted from the light source 11 through the light source control line 45.

The embodiments of the present disclosure also provide a control method of the display device according to any one of the above embodiments.

Figure 5:
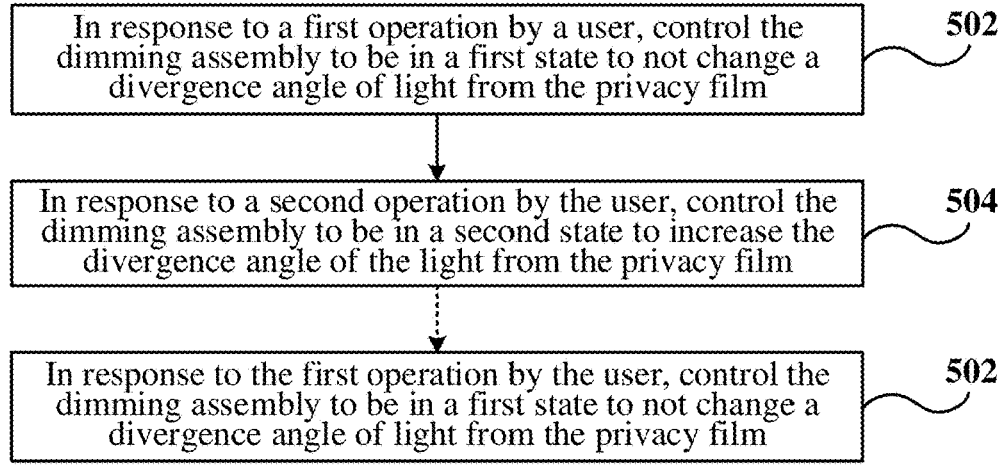
FIG. 5 is a schematic flowchart showing a control method of a display device according to an embodiment of the present disclosure.

FIG. 5 is a schematic flowchart showing a control method of a display device according to an embodiment of the present disclosure.

As shown in FIG. 5, the control method may comprise step 502 and step 504. It should be understood that the step 502 and the step 504 may be performed alternately. Therefore, FIG. 5 shows the step 502 after the step 504 with a dotted line.

At step 502, in response to a first operation by a user, the dimming assembly is controlled to be in a first state to not change a divergence angle of light from the privacy film, so that the display device is in the privacy mode.

At step 504, in response to a second operation by the user, the dimming assembly is controlled to be in a second state to increase the divergence angle of the light from the privacy film, so that the display device is in the sharing mode.

In some embodiments, in response to the first operation by the user, the light source in the backlight module may be controlled to exit light with a first brightness. For example, in response to the first operation by the user, the brightness of the light from the light source in the backlight module may be controlled to decrease. In addition, in response to a second operation by the user, the light source in the backlight module may be controlled to exit light with a second brightness greater than the first brightness. For example, in response to the second operation by the user, the brightness of the light from the light source in the backlight module may be controlled to increase. In this way, a brightness of the display device in the privacy mode is close to a brightness of the in the sharing mode, thereby improving the display effect of the display device.

In the above embodiments, in response to different operations by the user, the dimming assembly 14 may be controlled to be in different states so as to not change or increase the divergence angle of the light from the privacy film 13, so that the display device may switch between the privacy mode and the sharing mode.

Figure 6A:
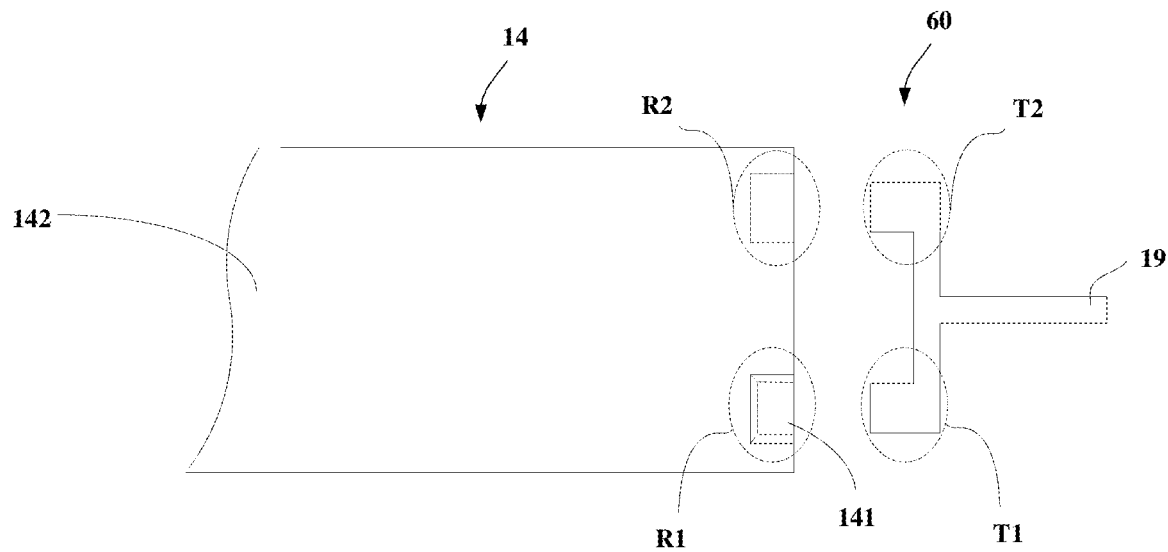
FIGS. 6A and 6B are schematic top views showing a first wire and a second wire respectively connected to a first transparent electrode and a second transparent electrode in a dimming assembly according to an embodiment of the present disclosure.
Figure 6B:
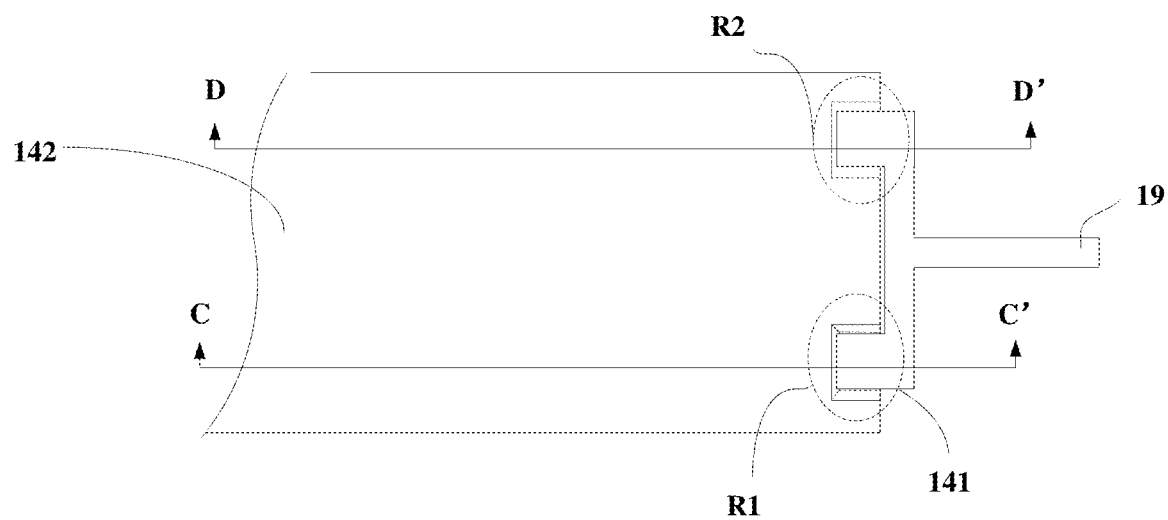

FIGS. 6A and 6B are schematic top views showing a first wire and a second wire respectively connected to a first transparent electrode and a second transparent electrode in a dimming assembly according to an embodiment of the present disclosure. The following description is made by taking the first conductive line and the second conductive line located in a flexible printed circuit 60 as an example.

It should be noted that, in order to clearly show the structure of the dimming assembly 14, FIG. 6A shows a state where the first wire 18 and the second wire 19 are separated from the dimming assembly 14, and FIG. 6B shows a state where the first wire 18 and the second wire 19 are combined with the dimming assembly 14.

As shown in FIGS. 6A and 6B, the dimming module 14 defines a first notch R1 and a second notch R2. The flexible printed circuit 60 in which the first wire 18 and the second wire 19 are located comprises a first protruding portion T1 and a second protruding portion T2. The first protruding portion T1 penetrates at least partially into the first recess R1, and the second protruding portion T2 penetrates at least partially into the second recess R2.

Figure 6C:
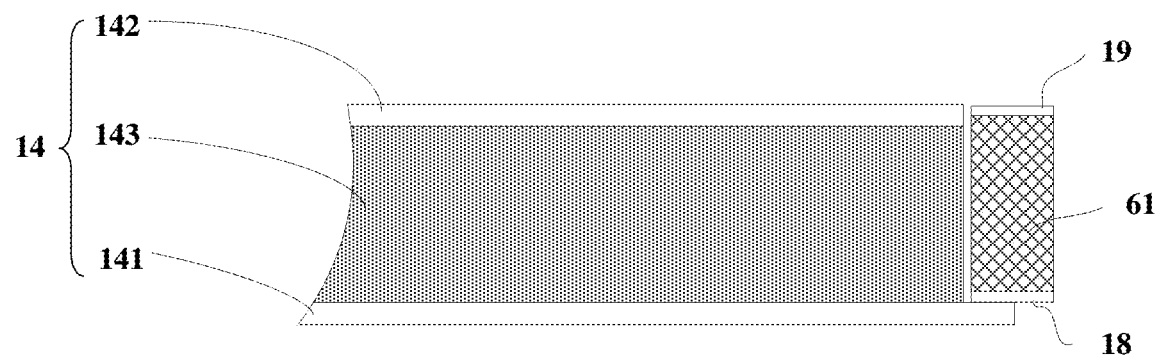
FIG. 6C shows a schematic cross-sectional view taken along C-C' shown in FIG. 6B.
Figure 6D:
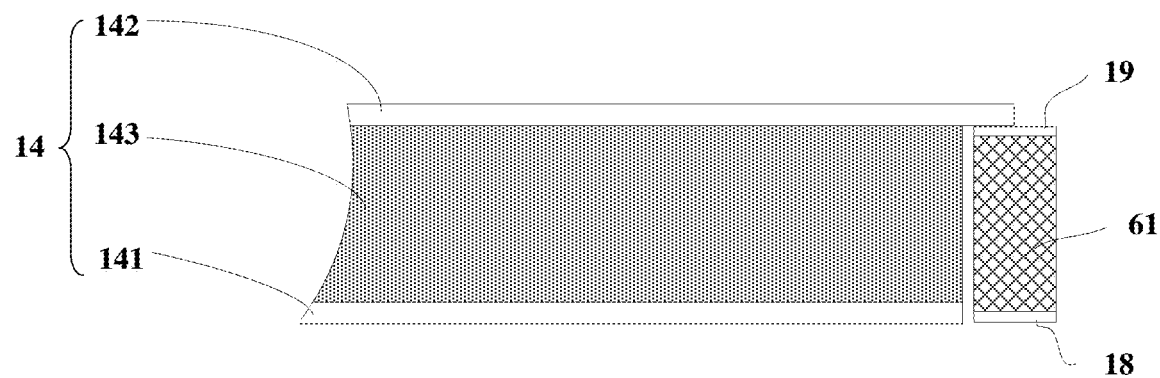
FIG. 6D shows a schematic cross-sectional view taken along D-D' shown in FIG. 6B.

FIG. 6C shows a schematic cross-sectional view taken along C-C' shown in FIG. 6B. FIG. 6D shows a schematic cross-sectional view taken along D-D' shown in FIG. 6B.

Referring to FIGS. 6A and 6C, at the first notch R1, the second transparent electrode 142 and the liquid crystal dimming film 143 are removed, and a part of the upper surface of the first transparent electrode 141 is exposed.

Referring to FIGS. 6A and 6D, at the second notch R2, the first transparent electrode 141 and the liquid crystal dimming film 143 are removed, and a part of the lower surface of the second transparent electrode 142 is exposed.

As shown in FIGS. 6C and 6D, the first wire 18 and the second wire 19 may be respectively disposed on the lower and upper surfaces of an insulating substrate 61. The first wire 18 is in contact with the exposed part of the first transparent electrode 141, and the second wire 19 is in contact with the exposed part of the second transparent electrode 142.

In some embodiments, the dimming assembly 14 may further comprise a first insulating substrate located on one side of the first transparent electrode 141 away from the liquid crystal dimming film 142, and a second insulating substrate located on one side of the second transparent electrode 142 away from the liquid crystal dimming film 142. In other words, the structures shown in FIGS. 6C and 6D each is located between the first insulating substrate and the second insulating substrate.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A backlight module, comprising:
   a light source;
   an optical film;
   a privacy film disposed on a light exit side of the optical film, and configured to reduce a divergence angle of light from the optical film; and
   a dimming assembly disposed on one side of the privacy film away from the optical film, and configured to not change a divergence angle of light from the privacy film in a case of being in a first state, and increase the divergence angle of the light from the privacy film in a case of being in a second state, wherein the light source is configured to emit light with a first brightness in the case where the dimming assembly is in the first state, and to emit light with a second brightness in the case where the dimming assembly is in the second state, wherein the first brightness is smaller than the second brightness.

2. The backlight module according to claim 1, wherein the optical film comprises a diffusion film and a prism film, and the privacy film is disposed on one side of the prism film away from the diffusion film.

3. The backlight module according to claim 1, wherein the privacy film comprises a plurality of grating bodies, wherein adjacent grating bodies of the plurality of grating bodies define a gap, and each of the plurality of grating bodies is opaque.

4. A display device comprising the backlight module according to claim 1.

5. The display device according to claim 4, further comprising: a display panel disposed on one side of the dimming assembly away from the privacy film.

6. The display device according to claim 4, further comprising: a control circuit configured to control the dimming assembly to be in one of the first state and the second state in response to a control signal.

7. The display device according to claim 6, wherein the control circuit is further configured to control the light source to emit light with a first brightness in the case where the dimming assembly is in the first state, and control the light source to emit light with a second brightness in the case where the dimming assembly is in the second state, wherein the first brightness is smaller than the second brightness.

8. The display device according to claim 6, further comprising: a printed circuit board disposed on one side of the backlight module away from a light exit side of the backlight module, wherein
the printed circuit board is provided with the control circuit.

9. A backlight module, comprising:
a light source;
an optical film;
a privacy film disposed on a light exit side of the optical film, and configured to reduce a divergence angle of light from the optical film; and
a dimming assembly disposed on one side of the privacy film away from the optical film, and configured to not change a divergence angle of light from the privacy film in a case of being in a first state, and increase the divergence angle of the light from the privacy film in a case of being in a second state, wherein the dimming assembly comprises:
a first transparent electrode,
a second transparent electrode, and
a liquid crystal dimming film disposed between the first transparent electrode and the second transparent electrode, wherein the liquid crystal dimming film is in a transparent state in the case where the dimming assembly is in the first state, and in a diffusion state in the case where the dimming assembly is in the second state.

10. The backlight module according to claim 9, further comprising:
a backplane comprising a bottom plate and a side plate connected to the bottom plate, wherein the bottom plate and the side plate define an accommodating space;
a light guide plate disposed in the accommodating space, wherein the optical film is disposed on one side of the light guide plate away from the bottom plate, and the light source is disposed between the light guide plate and the side plate;
a middle frame, comprising:
a first middle frame portion disposed on one side of the side plate away from the light source, and
a second middle frame portion connected to the first middle frame portion, and configured to fix the dimming assembly and support a display panel;
a first wire connected to the first transparent electrode, wherein the first wire extends between the side plate and the first middle frame portion, and further extends to one side of the bottom plate away from the light guide plate; and
a second wire connected to the second transparent electrode, wherein the second wire extends between the side plate and the first middle frame portion, and further extends to one side of the bottom plate away from the light guide plate.

11. The backlight module according to claim 10, further comprising:
a heat insulator disposed between the side plate and at least one of the first wire or the second wire.

12. The backlight module according to claim 11, wherein the heat insulator extends from one side of the side plate away from the light source to one side of the light source away from the bottom plate.

13. The backlight module according to claim 11, wherein a material of the heat insulator comprises silica gel.

14. The backlight module according to claim 10, wherein the first wire and the second wire are disposed in a flexible printed circuit.

15. The backlight module according to claim 9, wherein a material of the liquid crystal dimming film comprises a polymer dispersed liquid crystal.

16. The backlight module according to claim 9, wherein a material of at least one of the first transparent electrode or the second transparent electrode comprises indium tin oxide.

17. The backlight module according to claim 9,
wherein the privacy film comprises a plurality of grating bodies, and
wherein adjacent grating bodies of the plurality of grating bodies define a gap, and each of the plurality of grating bodies is opaque.

18. A display device comprising the backlight module according to claim 9.

19. A control method of a display device, wherein the display device comprises a backlight module comprising:
a light source;
an optical film;
a privacy film disposed on a light exit side of the optical film, and configured to reduce a divergence angle of light from the optical film; and
a dimming assembly disposed on one side of the privacy film away from the optical film, and configured to not change a divergence angle of light from the privacy film in a case of being in a first state, and increase the divergence angle of the light from the privacy film in a case of being in a second state; and
wherein the control method comprises:
controlling the dimming assembly to be in the first state to not change the divergence angle of the light from the privacy film, in response to a first operation by a user; and controlling the dimming assembly to be in the second state to increase the divergence angle of the light from the privacy film, in response to a second operation by the user.

20. The control method of claim 19, further comprising:
controlling the light source to emit light with a first brightness in response to the first operation; and
controlling the light source to emit light with a second brightness in response to the second operation, wherein the first brightness is smaller than the second brightness.

\* \* \* \* \*